United States Patent [19]

Karlsson et al.

[11] Patent Number: 4,648,760
[45] Date of Patent: Mar. 10, 1987

[54] DRILL AND CUTTING INSERT THEREFOR

[75] Inventors: Kurt O. Karlsson, Sandviken; Leif E. Karlsson, Karlholmsbruk, both of Sweden

[73] Assignee: Santrade Limited, Lucerne, Switzerland

[21] Appl. No.: 793,259

[22] Filed: Oct. 31, 1985

[30] Foreign Application Priority Data

Nov. 12, 1984 [SE] Sweden .................................. 8405643

[51] Int. Cl.⁴ .................................................. B23B 51/00
[52] U.S. Cl. ....................................... 408/223; 407/113; 408/186; 408/713
[58] Field of Search ............... 408/186, 223, 224, 229, 408/705, 713, 188, 189, 199, 227, 228, 231, 233; 407/113, 114

[56] References Cited

U.S. PATENT DOCUMENTS

| | | | |
|---|---|---|---|
| 3,955,259 | 5/1976 | Gustafsson | 407/113 X |
| 4,124,328 | 11/1978 | Hopkins | 408/713 X |
| 4,220,429 | 9/1980 | Powers et al. | 408/224 |
| 4,268,198 | 5/1981 | Peters | 408/186 |
| 4,475,851 | 10/1984 | Hale | 407/113 |
| 4,527,931 | 7/1985 | Sarin | 408/713 X |
| 4,558,975 | 12/1985 | Hale | 408/713 X |
| 4,563,113 | 1/1986 | Ebenhoch | 408/713 X |
| 4,564,321 | 1/1986 | Rondo et al. | 408/713 X |

FOREIGN PATENT DOCUMENTS

| | | | |
|---|---|---|---|
| 2550333 | 5/1977 | Fed. Rep. of Germany | 407/114 |
| 2555979 | 6/1977 | Fed. Rep. of Germany | 407/113 |
| 2116081 | 9/1983 | United Kingdom | 407/114 |
| 2132517 | 7/1984 | United Kingdom | 408/186 |

Primary Examiner—Gil Weidenfeld
Assistant Examiner—Glenn L. Webb
Attorney, Agent, or Firm—Burns, Doane, Swecker & Mathis

[57] ABSTRACT

The invention relates to a short-hole drill and a cutting insert therefor, for drilling of metallic work pieces. The drill comprises a drill shank with two chip flutes formed therein and with two cutting insert sites and two mainly rectangular cutting inserts having mutually identical shaping. The cutting inserts are accommodated in the cutting insert sites and secured thereto by means of lock screws such that the broken non-active cutting edge abuts against a broken support surface in each cutting insert site while the active cutting edge projects axially forwards. The cutting insert which is arranged radially outermost is inclined such that it determines the size of the bore while the longitudinal axis of the other cutting insert is arranged parallel to the center line (CL) of the drill. The distance between the outermost parts of each cutting edge is longer than the shortest distance between the long side surfaces of the cutting insert.

8 Claims, 12 Drawing Figures

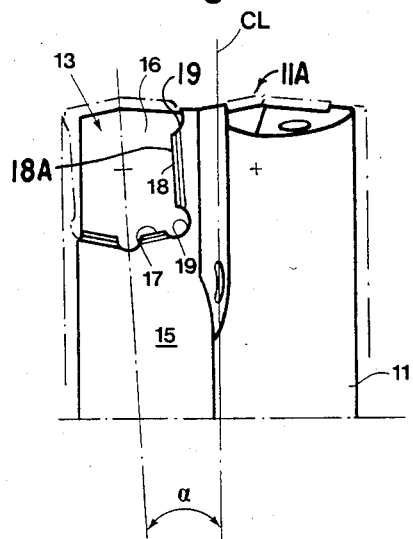
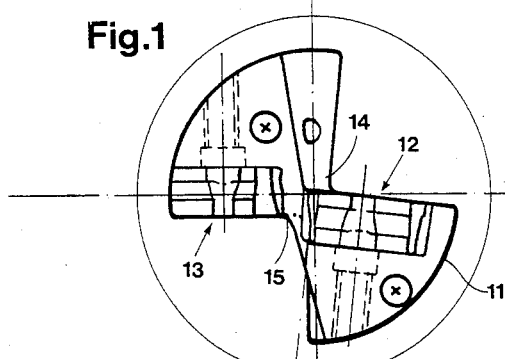
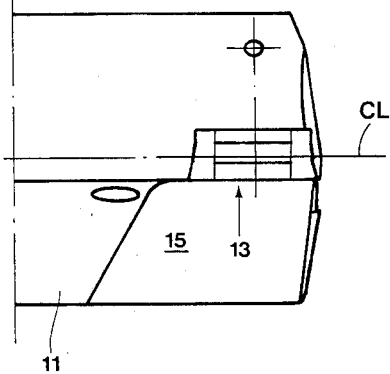
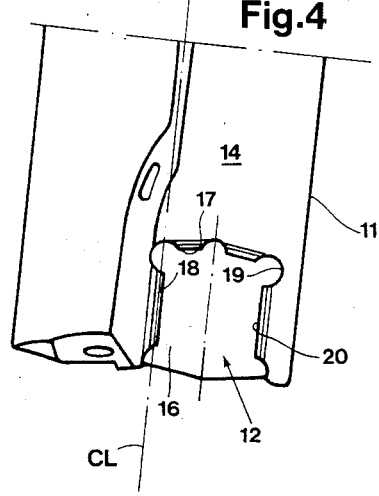

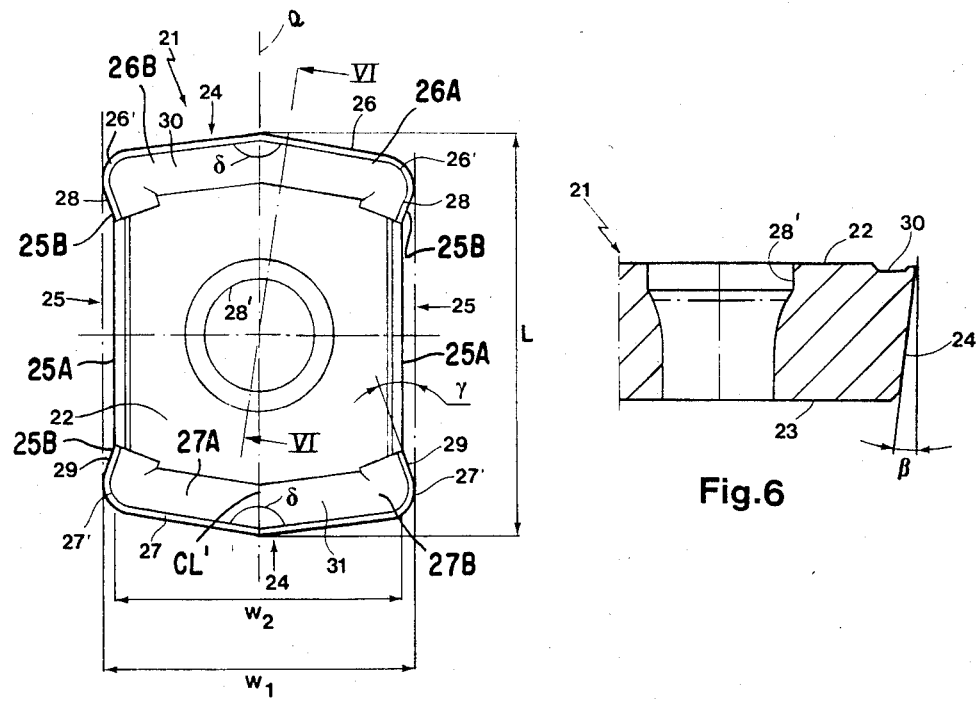
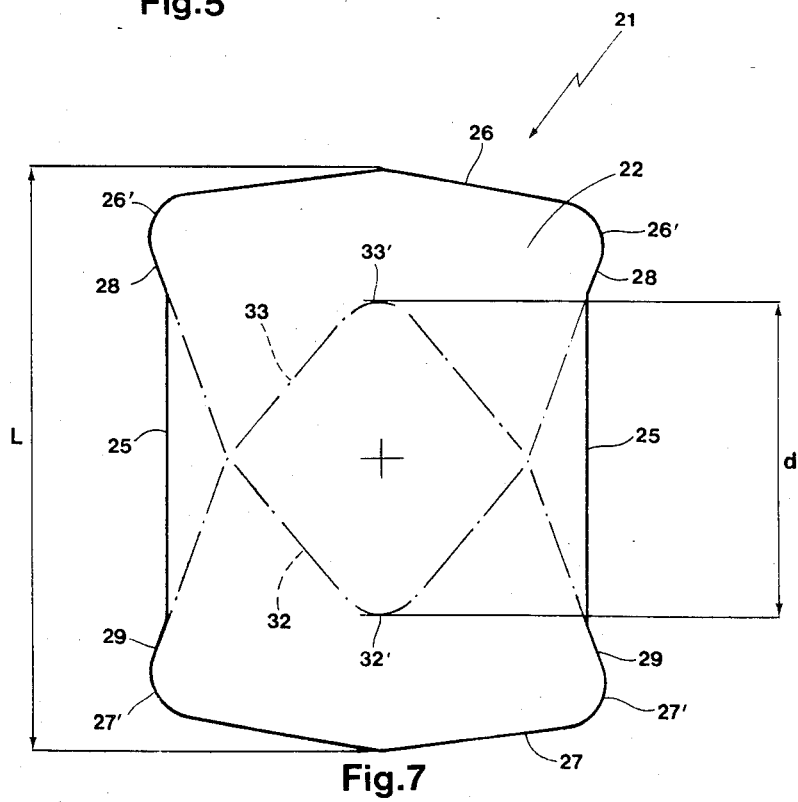

DRILL AND CUTTING INSERT THEREFOR

BACKGROUND AND OBJECTS OF THE INVENTION

The present invention relates to a drill for drilling of preferably metallic work pieces and a cutting insert for use in this drill.

Hitherto known drills comprise either rectangular, rhombical or triangular cutting inserts. When using drills having rectangular cutting inserts problems often arise with deflections of the drill shank at drilling in the solid work piece due to the cutting inserts having straight unbroken cutting edges. One of the cutting inserts must overlap the center of the drill which often results in that the engagement of one cutting edge with the work piece becomes shorter than the engagement of the other cutting edge. This results in unevenly acting cutting forces and therefore the drill may cut unbalanced and may give the hole tolerance faults. The straight long side of the rectangular cutting insert may cause vibrational damages on the exit side of the drill hole. In drills carrying triangular or rhombical cutting inserts broken cutting edges are often used and therefore it is possible to achieve a balanced cutting engagement. The triangular or rhombical shape, however, gives the cutting insert, especially at smaller dimensions, a small strength and a small space for chip breakers inside the cutting edges, primarily depending on the provision of a central securing hole. A fractured cutting insert may destroy both the work piece and the drill shank.

The present invention relates to a drill and a cutting insert therefor which solves the above mentioned problems.

THE DRAWINGS

The invention will be more closely described below in connection with the following drawings.

FIGS. 1-4 show a top view resp three side views of a drill shank.

FIG. 5 shows a plane view of a cutting insert according to the invention.

FIG. 6 shows a sectional side view of the cutting insert in FIG. 4 according to the line VI—VI.

FIG. 7 shows a plane view of the periphery of the cutting insert.

DETAILED DESCRIPTION OF PREFERRED EMBODIMENTS OF THE INVENTION

Figure 8:
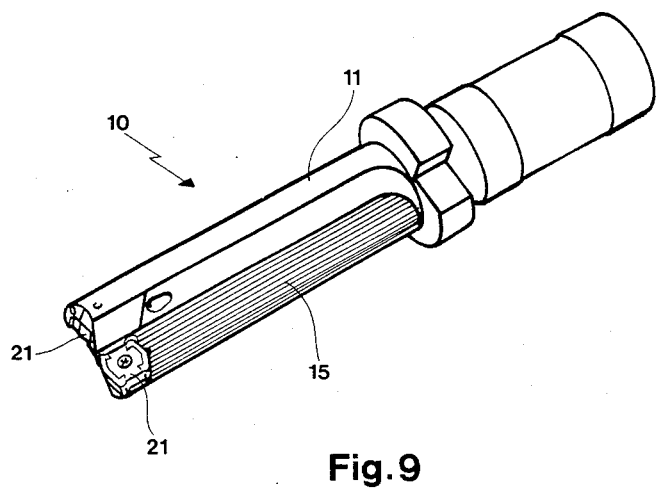
FIGS. 8-10 show a perspective view, a top view resp a side view of a drill according to the invention.
Figure 9:
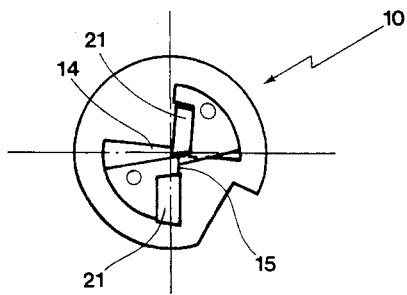
Figure 10:
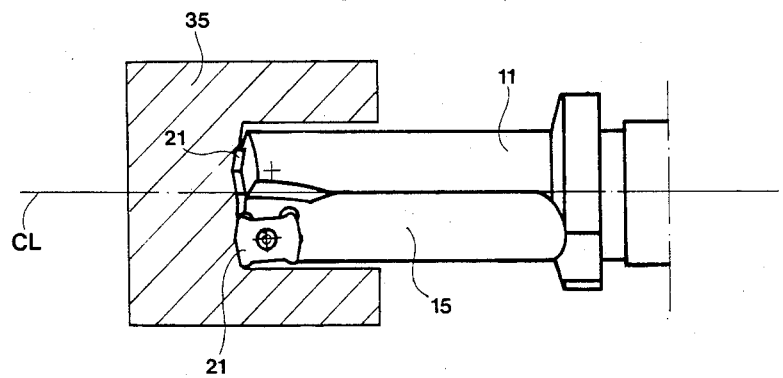
Figure 11:
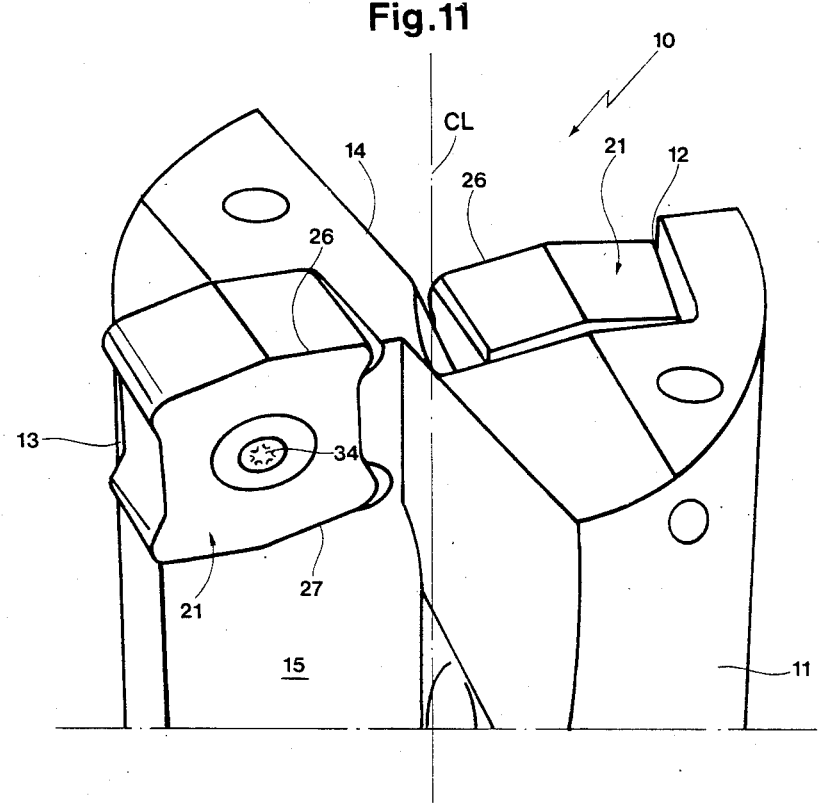
FIG. 11 shows a perspective view of the cutting end of the drill.

FIGS. 1-4 show a portion of a cylindrical drill shank 11 which at its most forward part or cutting face 11A is provided with two cutting insert sites 12, 13 positioned mainly on each side of the center line CL of the drill. Axial flutes or passages for the flow of chips are depicted by 14 and 15. Both of the cutting insert sites 12, 13 are centrally provided with holes to receive lock screws (not shown) for locking of the cutting inserts in the sites. The sites consist of a central side 12 which is arranged radially inside the outer periphery 11B of the drill shank 11 and a peripheral site 13 which terminates in the periphery of the drill shank. The cutting insert sites 12 and 13 are shaped in the drill shank 11 such that they define different axial clearance angles and together achieve drilling of the complete hole diameter.

Each cutting insert site 12 and 13 comprises a first support surface 16 provided to receive tangential cutting forces acting upon the drill, a second support surface 17 provided to receive axial cutting forces and a third support surface 18 provided to receive radial cutting forces. The support surfaces 18 are shaped for cutting inserts having positive cutting geometry and they include a main section 18A and front and rear recessed sections 19, 19 is located at longitudinal ends of the main section to receive a plurality of the corners of the cutting inserts. The first support surfaces 16 are mainly parallel with different radial planes through the center line CL. Each second support surface 17 is broken so that it forms a mainly V-shaped profile, the apex of which is directed axially rearwards towards the fastening portion of the shank i.e., the surface 17 includes longitudinally inwardly converging sections 17A, 17B.

The mid-line of the central site 12, see FIG. 4, is mainly parallel with the center line CL of the drill shank and the third support surface 18 at least partly coincides with the latter. A surface 20 in the central site 12 opposite to the third support surface 18 has no supporting function for the cutting insert but aims only to prevent wedging up of chips between the shank and the central site.

The peripheral site 13 is arranged to receive a cutting insert, shown with dotted lines in FIG. 3, whose active cutting edge projects in radial direction such that the diameter of the bore is determined thereby. At the site 13 the third support surface 18 is inclined relative to the center line CL of the drill shank at an acute angle $\alpha$ of about 2° to 3° to achieve sufficient clearance for the cutting insert.

Furthermore the drill shank 11 is provided with a number of passages which conduct fluid to the cutting area for removal of cut chips via the chip flutes 14, 15.

FIGS. 5 and 6 show an indexable cutting insert for use in the above described drill shank. The cutting insert 21 has a mainly rectangular basic shape comprising an upper face 22 and a lower face 23, which are mainly parallel with each other. The faces 22, 23 are joined by side surfaces 24 and 25 which correspond to short and long sides in the rectangle. The lower face 23 is smaller than the upper face 22, and therefore the cutting insert achieves a positive clearance angle $\beta$. The intersection lines of the short sides with the upper face 22 form two main cutting edges 26, 27, only one of which cuts the work piece at each drilling operation. Each main cutting edge is broken at its middle and forms a V with an internal obtuse angle $\delta$, i.e., each main cutting edge comprises a pair of outwardly converging sections 26A, 26B, 27A, 27B which intersect along a center line CL' of the insert. The apex of the V-form is directed away from the center hole 28' of the cutting insert. Each main cutting edge 26, 27 is rounded off at parts forming nose portions 26', 27' situated furthest away from the longitudinal axis a, between which the largest width $w_1$ is defined. The cutting insert 21 seen in top view tapers inside the nose portions 26', 27' to a straight waist, defined by inwardly recessed portions 25A of the side surfaces 25, whose shortest width $w_2$ is somewhat less than the width $w_1$. The nose portion 26', 27' is connected with the waist via a minor cutting edge 28, 29, defined by the intersection of transition portions 25B of the side surfaces 25. Each minor cutting edge is facing in a direction away from the associated main cutting edge, i.e., in a direction toward the opposite one of the side surfaces 26 or 27, whereby the minor cutting edges can cut the work piece during the return movement of the drill. The minor cutting edge 28, 29 forms an acute angle $\gamma$ with the edge surface 25 of between 15° and 25°. The upper face 22 is provided with a chip breaker in form of a groove 30, 31 inside each cutting edge portion. The groove may be combined with or be exchanged to projections separated from each other or recesses. The length of the cutting insert which is defined by the distance between the break points of the main cutting edges 26, 27 is depicted by L. The width $w_1$ is 10 to 30% wider than the width $w_2$.

FIG. 7 shows the periphery of said cutting insert 21 in top view. Two regular triangles 32, 33 having broken sides are depicted in the cutting insert 21. Two of the corners of each triangle 32, 33 and one of its sides are depicted such that they coincide with the nose portions 26′,27′ and the main cutting edge 26,27 and parts of the two other sides of resp triangle coincide with the whole of the minor cutting edges 28,29. The third corner 32′,33′ of each triangle is thus arranged relatively centrally in the cutting insert and at a distance d from each other. This distance is shorter than the length L of the cutting insert, such that d is 0.4 to 0.8 times L, preferably 0.5 to 0.7 times L. The distance d mainly corresponds to the straight (i.e., recessed) part of the side surface 25.

A cutting insert with the shown shape offers larger spaces between cutting edge and center hole for shaping of chip formers and the shape gives a durable cutting insert which endures large cutting forces compared to for example the triangular shape depicted in FIG. 7.

The cutting insert 21 is made of hard material, preferably hard metal such as cemented tungsten carbide. FIGS. 8–11 show views of a drill according to the invention. The drill 10 comprises a drill shank 11, chip flutes 14, 15 and two indexable cutting inserts 21. The cutting inserts 21 are received in the central site 12 and the peripheral site 13 and lock screws 34 hold the cutting insert against the support surfaces of the sites. The cutting inserts 21 are arranged on each side of the center line CL of the drill and their active main cutting edges 26 cooperate to cut chips from a work piece, forming a hole which is somewhat larger than the diameter of the drill shank 11. Their opposite short side surfaces abut against the second support surfaces 17 of the sites.

Figure 12:
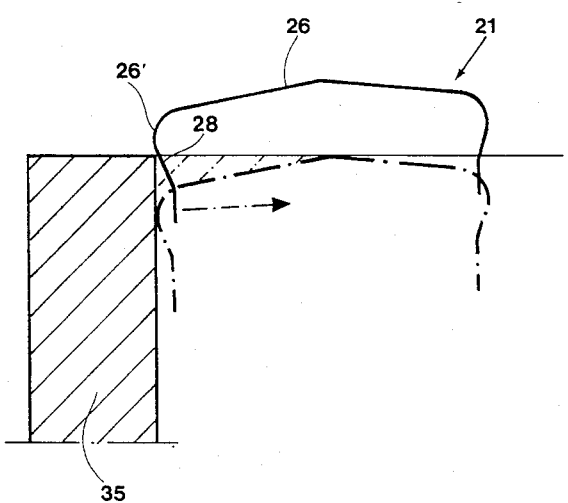
FIG. 12 shows a view of a portion of the drill in engagement with a work piece.

FIG. 12 shows a part of the peripheral cutting insert 21 of the drill. The dotted lines describe the position of the cutting insert 21 and the appearance of the bore at the moment when the break point of the cutting edge 26 breaks through the work piece on the exit side. The cutting forces against the radially inner part of the active cutting edge 26 thereby cease and therefore the end of the drill is somewhat deflected in the direction of the arrow in FIG. 12. Then when the drill has completely penetrated the work piece this will rebound radially outwardly; due to that all the cutting forces acting upon the cutting edges cease and therefore the exit side of the bore achieves a somewhat smaller diameter than the other parts of the hole. If the long sides of the cutting insert were completely straight serious vibrational damages would occur on the cutting edge and on the hole at the exit side due to the rebounding, but as the present cutting insert has a waist inside the main cutting edge 26, these damages are avoided. At a slow return movement of the drill the minor cutting edge 28 may finely cut the hole so that it obtains a constant diameter along its entire extension.

Thus, the present invention relates to a drill and a cutting insert therefor. The cutting insert is shaped such that it can drill without vibrational damages on the bore and finely cut at return movement of the drill. The cutting insert is formed in order to give space for chip breakers of different types and to endure large cutting forces especially in drills with small diameters.

What is claimed is:

1. A cutting insert for use on a rotary drill, comprising a body of generally rectangular configuration including upper and lower faces interconnected by opposed first side surfaces and opposed second side surfaces, said second side surfaces being longer than said first side surfaces in a direction parallel to said faces, the intersection of said first side surfaces and said upper face defining first cutting edges which cut a workpiece when said insert is advanced in a first direction through the workpiece, each of said first cutting edges extending from adjacent one said second side surface to adjacent the other said second side surface, each first cutting edge including a pair of sections converging outwardly of said body from ends of the respective first cutting edge and intersecting along a center line of said drill to form an included obtuse angle, each of said second side surfaces comprising a recessed portion and a pair of transition portions disposed at opposite ends of said recessed portion for interconnecting said recessed portion with respective ends of said first cutting edges, the intersection of said transition portions with said upper face defining second cutting edges, said lower face being of less area than upper face such that said first side surfaces and said transition portions define a positive clearance angle for said first and second cutting edges, said recessed portions being recessed inwardly relative to said ends of said first cutting edges such that:

the shortest distance between said recessed portions is shorter than the shortest distance between the ends of each first cutting edge to minimize contact between said recessed portions and a wall of a bore being drilled, and each of said second cutting edges faces generally toward an opposite end of its associated second side surface to define a cutting edge which cuts the workpiece when the insert is pulled back through the drilled hole in a direction opposite said first direction.

2. A cutting insert according to claim 1, wherein the length of each said recessed portion is a fraction of from 0.4 to 0.8 times the distance between the points of intersection of said sections of said first cutting edges.

3. A cutting insert according to claim 2, wherein said fraction is from 0.5 to 0.7.

4. A cutting insert according to claim 1, wherein said upper face includes chip breakers situated inwardly of said first cutting edges.

5. A cutting insert according to claim 1, wherein said shortest distance between the ends of each first cutting edge is from 10 to 30% greater than said shortest distance between said recessed portions.

6. A drill adapted to receive a plurality of inserts including first and second identically shaped inserts each including opposed cutting edges such that one cutting edge is positioned to cut and the other cutting edge is positioned to be inactive; said drill being rotatable about a longitudinal axis and including a front cutting face, an outer longitudinal surface, first and second chip flutes formed in said outer surface, and first and second insert sites disposed at forward ends of said first and second flutes, respectively, for receiving said first and second inserts; said first insert site disposed radially inwardly with respect to said second insert site; a radially outermost portion of said first insert site disposed radially inwardly of said outer surface of said drill; said second insert site radially intersecting said outer surface; each of said insert sites comprising a first support surface arranged to receive tangential cutting forces acting upon the drill, a second support surface arranged to receive axial cutting forces, and a third support surface arranged to receive radial cutting forces; each of said second support surfaces including longitudinally inwardly converging sections adapted to support a corresponding inactive cutting edge of the respective inserts; said third support surface of said first insert site including a main section extending parallel to said longitudinal axis, and front and rear recessed sections disposed at longitudinal ends of said main section; each of said recessed sections being recessed radially inwardly with respect to said main section and extending radially beyond said longitudinal axis for receiving corresponding cutting edge portions of said first insert, said front recessed section disposed at said front cutting face; said third support surface of said second insert site including a main section diverging longitudinally outwardly relative to said longitudinal axis to form an acute angle therewith, and front and rear recessed sections disposed at longitudinal ends of said last-named main section; each of said last-named recessed sections of said second insert site being recessed radially inwardly with respect to said last-named main section for receiving corresponding cutting edge portions of said second insert, said last-named front recessed portion disposed at said front cutting face.

7. A drill according to claim 6, wherein said acute angle is from 1° to 5°.

8. A drill according to claim 7, wherein said angle is from 2° to 3°.

* * * * *